United States Patent Office 3,124,620
Patented Mar. 10, 1964

3,124,620
STABILIZATION OF CHLORINATED HYDRO-
CARBONS WITH 1,4-DIOXANE AND ACETY-
LENIC ALCOHOL ESTER
George Davidowich, Bayonne, and Morton W. Leeds,
Murray Hill, N.J., assignors to Air Reduction Company, Incorporated, New York, N.Y., a corporation of
New York
No Drawing. Filed May 1, 1961, Ser. No. 106,475
8 Claims. (Cl. 260—652.5)

This invention relates to the stabilization of chlorinated hydrocarbons. More particularly, this invention relates to novel stabilized chlorinated hydrocarbon compositions and to processes for producing the same.

Chlorinated hydrocarbons are widely used as solvents for a variety of purposes such as degreasing metal articles, dry cleaning, and extraction of caffeine from coffee. A serious drawback encountered in their use is their tendency to undergo degradation by oxidation, hydrolysis or pyrolysis on exposure to light, air, heat, moisture or metal surfaces.

Various stabilizers have been used to retard the decomposition of chlorinated hydrocarbons. Many of these stabilizers substantially reduce the rate of decomposition and ar satisfactory for some purposes. However, new and improved stabilizers are constantly being sought to meet the expanding needs for chlorinated hydrocarbon solvents which are stable under diverse conditions.

A primary object of the present invention is to provide novel stabilized chlorinated hydrocarbon compositions. A further object of this invention is the use of a synergistic combination of two stabilizers to effect a substantially greater degree of stabilization than is obtainable with either stabilizer alone.

In accordance with the present invention it has been found that chlorinated hydrocarbons can be stabilized with small amounts of a mixture of 1,4-dioxane and a compound having the general formula

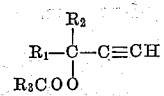

where $R_1$ is selected from the group consisting of alkyl radicals containing from 1 to about 10 carbon atoms and monocyclic aryl radicals containing from 6 to about 10 carbon atoms, $R_2$ is selected from the group consisting of methyl and ethyl, $R_1$ and $R_2$ together with the adjacent carbon atom constitute a cycloalkyl radical containing from 3 to 8 carbon atoms, and $R_3$ is selected from the group consisting of hydrogen and lower alkyl radicals containing from 1 to about 3 carbon atoms.

Among the suitable acetylenic ester stabilizers are 3-methyl-3-formyloxy-1-butyne, 3-methyl-3-acetoxy-1-butyne, 3-phenyl-3-acetoxy-1-butyne, 3-p-tolyl-3-acetoxy-1-butyne, 3-methyl-3-propionoxy-1-butyne, 3-methyl-3-acetoxy-1-pentyne, 3-ethyl-3-acetoxy-1-pentyne, 3-methyl-3-acetoxy-1-dodecyne, 3-p-tolyl-3-acetoxy-1-pentyne, and 1-acetoxy-1-ethynylcyclohexane; preferred stabilizers are 3-methyl-3-acetoxy-1-butyne and 3-methyl-3-acetoxy-1-pentyne. While some stabilization is achieved by the use of any one of these compounds alone, the stabilization achieved with both 1,4-dioxane and an acetylenic ester according to this invention is considerably greater than the additive effects of the two stabilizers. Effective stabilization according to this invention is achieved by adding from about 0.1 to about 0.5 percent by volume of 1,4-dioxane and from about 0.1 to about 0.5 percent by volume of an acetylenic ester stabilizer having the formula previously indicated to the chlorinated hydrocarbon to be stabilized. The synergistic effect of the two stabilizers is especially pronounced in chlorinated hydrocarbon solutions having approximately equal volumes of the two stabilizers. However, the ratio of the two stabilizers can be varied over wide limits, as will be apparent to those skilled in the art, provided the maximum and minimum concentrations of each stabilizer are within the limits set forth above.

The chlorinated hydrocarbon to be stabilized may be any one of the lower molecular weight chlorinated hydrocarbons such as carbon tetrachloride, chloroform, trichloroethylene, perchloroethylene, ethylene dichloride, 1,3-dichloropropane, and the like.

The marked effectiveness of the synergistic combinations of the present invention is illustrated by the following example.

EXAMPLE 1

In all of the stability tests described herein, the stability is determined according to the following procedure:

One hundred ml. of carbon tetrachloride having a stabilizer content as indicated in Table I below is placed in a 125 ml. Erlenmeyer flask fitted with an air condenser. To the flask is added an aluminum strip 2" x ½" which has been scratched five times on each side with scissors. The solution is refluxed for approximately 8 hours and allowed to stand at room temperature for approximately 16 hours each day for the duration of the test. Except as otherwise indicated, the test is terminated when corrosion of the aluminum test specimen is observed. The reflux times are indicated in Table I below.

Solutions 1 to 3, inclusive, represent solutions stabilized with two stabilizers according to the present invention. Solutions 4 to 7, inclusive, are given for purposes of comparison to show the stability of carbon tetrachloride stabilized with only a single stabilizer in the same test procedure. Solution 8 is given for purposes of comparision to show the lack of stability of unstabilized carbon tetrachloride.

Table I below shows the results obtained in each of the stabilization tests carried out according to the foregoing procedure. The solutions are observed to be a light straw color and the aluminum specimens show signs of attack, indicating slight decomposition at the end of the test, except as otherwise noted.

*Table I*

| Run No. | Stabilizing Agent | Percent by Volume | Reflux time, hours |
|---|---|---|---|
| 1 | 1,4-dioxane<br>+3-methyl-3-acetoxy-1-butyne | 0.1<br>0.1 | 21 |
| 2 | 1,4-dioxane<br>+3-methyl-3-acetoxy-1-butyne | 0.2<br>0.2 | 1 31 |
| 3 | 1,4-dioxane<br>+3-methyl-3-acetoxy-1-pentyne | 0.2<br>0.2 | 1 31 |
| 4 | 1,4-dioxane | 0.1 | 5 |
| 5 | do | 0.2 | 6 |
| 6 | 3-methyl-3-acetoxy-1-butyne | 0.1 | 2 |
| 7 | do | 0.2 | 5 |
| 8 | None | | 2 1 |

[1] Solution clear, specimen not attacked at end of test.
[2] Solution highly colored, specimen showed considerable corrosion.

There is no apparent decomposition in runs 2 and 3 above, as indicated by clear solutions and absence of any attack on the aluminum specimens at the end of the respective tests. The same stabilizer combinations in lower concentrations imparted stability over long periods of time in run 1. Much shorter periods of stabilization are observed in carbon tetrachloride solutions containing only a single stabilizer in runs 4 to 7. For example, decomposition of carbon tetrachloride containing 0.1 percent by volume of 1,4-dioxane plus 0.1 percent by volume of 3-methyl-3-acetoxy-1-butyne is observed only after 21 hours of refluxing. In contrast, decomposition of carbon tetrachloride stabilized with 0.1 percent by volume of 1,4-dioxane alone is observed after 5 hours, and decomposition of carbon tetrachloride stabilized with 0.1 percent by volume of 3-methyl-3-acetoxy-1-butyne alone is observed only after 2 hours.

EXAMPLE 2

Carbon tetrachloride is stabilized with a pair of stabilizing agents as indicated in Table II below:

Table II

| Run No. | Stabilizing Agent | Percent by Volume |
|---|---|---|
| 9 | 1,4-dioxane | 0.1 |
|   | +3-methyl-3-acetoxy-1-butyne | 0.2 |
| 10 | 1,4-dioxane | 0.2 |
|    | +3-methyl-3-acetoxy-1-pentyne | 0.1 |
| 11 | 1,4-dioxane | 0.2 |
|    | +3-methyl-3-propionoxy-1-butyne | 0.2 |
| 12 | 1,4-dioxane | 0.2 |
|    | +3-methyl-3-acetoxy-1-hexyne | 0.2 |
| 13 | 1,4-dioxane | 0.2 |
|    | +3-methyl-3-acetoxyl-1-decyne | 0.3 |
| 14 | 1,4-dioxane | 0.2 |
|    | +3-phenyl-3-acetoxy-1-butyne | 0.2 |
| 15 | 1,4-dioxane | 0.2 |
|    | +3-p-tolyl-3-acetoxy-1-pentyne | 0.2 |
| 16 | 1,4-dioxane | 0.2 |
|    | +3-ethyl-3-acetoxy-1-pentyne | 0.2 |
| 17 | 1,4-dioxane | 0.2 |
|    | +1-acetoxy-1-ethynylcyclohexane | 0.2 |

The resulting solutions are stable against decomposition at both room temperature and elevated temperatures.

While the foregoing invention has been described with reference to specific embodiments thereof, it is understood that the scope of this invention is to be measured only by the scope of the appended claims.

We claim:

1. A composition of matter comprising carbon tetrachloride and small but stabilizing amounts of 1,4-dioxane and a compound having the formula

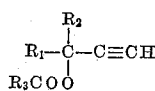

where $R_1$ is selected from the group consisting of alkyl radicals containing from 1 to about 10 carbon atoms and monocyclic aryl radicals containing from 6 to about 10 carbon atoms, $R_2$ is selected from the group consisting of methyl and ethyl, $R_1$ and $R_2$ together with the adjacent carbon atom constitute a cycloalkyl radical containing from 3 to 8 carbon atoms, and $R_3$ is selected from the group consisting of hydrogen and lower alkyl radicals.

2. A composition of matter comprising carbon tetrachloride, from about 0.1 to about 0.5 percent by volume of 1,4-dioxane, and from about 0.1 to about 0.5 percent of a compound having the formula

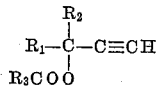

where $R_1$ is selected from the group consisting of alkyl radicals containing from 1 to about 10 carbon atoms and monocyclic aryl radicals containing from 6 to about 10 carbon atoms, $R_2$ is selected from the group consisting of methyl and ethyl, $R_1$ and $R_2$ together with the adjacent carbon atom constitute a cycloalkyl radical containing from 3 to 8 carbon atoms, and $R_3$ is selected from the group consisting of hydrogen and lower alkyl radicals.

3. A composition of matter comprising carbon tetrachloride and small but stabilizing amounts of 1,4-dioxane and a compound selected from the group consisting of 3-methyl-3-acetoxy-1-butyne and 3-methyl-3-acetoxy-1-pentyne.

4. A composition of matter comprising carbon tetrachloride, from about 0.1 to about 0.5 percent by volume of 1,4-dioxane, and from about 0.1 to about 0.5 percent of a compound selected from the group consisting of 3-methyl-3-acetoxy-1-butyne and 3-methyl-3-acetoxy-1-pentyne.

5. A composition of matter comprising carbon tetrachloride and small but stabilizing amounts of 1,4-dioxane and 3-methyl-3-acetoxy-1-butyne.

6. A composition of matter comprising carbon tetrachloride and small but stabilizing amounts of 1,4-dioxane and 3-methyl-3-acetoxy-1-pentyne.

7. A composition of matter comprising carbon tetrachloride, from about 0.1 to about 0.5 percent by volume of 1,4-dioxane, and from about 0.1 to about 0.5 percent of 3-methyl-3-acetoxy-1-butyne.

8. A composition of matter comprising carbon tetrachloride, from about 0.1 to about 0.5 percent by volume of 1,4-dioxane, and from about 0.1 to about 0.5 percent of 3-methyl-3-acetoxy-1-pentyne.

References Cited in the file of this patent

UNITED STATES PATENTS

| 2,811,252 | Bachtel | Oct. 29, 1957 |
| 2,906,783 | Monroe et al. | Sept. 29, 1959 |
| 2,958,711 | Skeeters | Nov. 1, 1960 |
| 2,981,759 | Cole | Apr. 25, 1961 |